US 7,986,398 B2

(12) United States Patent
Langdon et al.

(10) Patent No.: US 7,986,398 B2
(45) Date of Patent: Jul. 26, 2011

(54) GAS VELOCITY SENSOR

(75) Inventors: Roger Martin Langdon, Colchester (GB); Andrew Graham McCarthy, Chelmsford (GB)

(73) Assignee: BAE Systems PLC, London (GB)

( * ) Notice: Subject to any disclaimer, the term of this patent is extended or adjusted under 35 U.S.C. 154(b) by 167 days.

(21) Appl. No.: 12/227,510

(22) PCT Filed: Sep. 2, 2008

(86) PCT No.: PCT/GB2008/050766
§ 371 (c)(1),
(2), (4) Date: Nov. 18, 2008

(87) PCT Pub. No.: WO2009/034370
PCT Pub. Date: Mar. 19, 2009

(65) Prior Publication Data
US 2010/0171944 A1    Jul. 8, 2010

(30) Foreign Application Priority Data

Sep. 11, 2007   (EP) .................................. 07253611
Sep. 11, 2007   (GB) ................................. 0717701.7

(51) Int. Cl.
    *G01P 3/36*    (2006.01)
(52) U.S. Cl. ............................ 356/28.5; 356/28
(58) Field of Classification Search ........ 356/3.01–3.15, 356/4.01–4.1, 5.01–5.15, 6–28.5
    See application file for complete search history.

(56) References Cited

U.S. PATENT DOCUMENTS

| 4,195,931 | A | 4/1980 | Hara |
| 5,317,376 | A | 5/1994 | Amzajerdian et al. |
| 2004/0263826 | A1* | 12/2004 | Langdon ............... 356/28.5 |

FOREIGN PATENT DOCUMENTS

WO    WO 2004/077067    9/2004

OTHER PUBLICATIONS

European Patent Office, International Preliminary Report on Patentability and Written Opinion, Mar. 25, 2010, from International Patent Application No. PCT/GB2008/050766, filed on Feb. 9, 2008.
European Patent Office, International Search Report and Written Opinion, Nov. 13, 2008, from International Patent Application No. PCT/GB2008/050766, filed on Feb. 9, 2008.

* cited by examiner

*Primary Examiner* — Thomas Tarcza
*Assistant Examiner* — Luke Ratcliffe
(74) *Attorney, Agent, or Firm* — Kenyon & Kenyon, LLP (57) ABSTRACT

A method and apparatus for determining gas velocity, which includes generating transmitted radiation having an expected transmission frequency, detecting backscattered radiation, and determining gas velocity in dependence upon any Doppler shift of the frequency of the backscattered radiation, determining a transmission frequency of the transmitted radiation; detecting any difference between the measured transmission frequency and the expected transmission frequency and generating a feedback signal therefrom, and determining gas velocity using said feedback signal.

25 Claims, 5 Drawing Sheets

GAS VELOCITY SENSOR

RELATED APPLICATION INFORMATION

This application is a United States National Phase Patent Application of International Patent Application No. PCT/GB2008/050766 which was filed on Sep. 3, 2008, and claims priority to British Patent Application No. 0717701.7, filed on Sep. 11, 2007, and claims priority to European Patent Application No. 07253611.3, filed on Sep. 11, 2007, the disclosures of each of which are incorporated herein by reference.

FIELD OF THE INVENTION

The present invention relates to a gas velocity sensor and to a method of determining gas velocity. In particular the present invention relates to an air velocity sensor that is particularly suited to use on an aircraft such that the air speed of the aircraft can be determined. The present invention includes improvements to a gas velocity sensor of the type described in an international patent application by the present Applicant, published as WO 2004/077067.

BACKGROUND INFORMATION

Accurately measuring the velocity of an aircraft in flight can be achieved in many different ways, by mechanical, optical or electronic techniques.

In a known optical technique, a laser is used to illuminate a gas and the Doppler frequency shift due to gas flow in the light scattered by the gas molecules is measured using an interferometer. For the measurement of air speed, an ultraviolet laser is usually used because the intensity of backscatter of light by air molecules is much greater at short wavelengths than at long wavelengths.

Systems of this kind have advantages in measuring airspeed in aircraft because the air flow can be measured at a point remote from the measuring instrument, and therefore remote from flow disturbances caused by the aircraft structure. The laser beam can also be pointed in different directions to measure vector components of air velocity. This enables parameters such as angle of attack and side-slip to be measured; quantities which are difficult to measure reliably using Pitot-tube air flow sensors currently used on aircraft.

However, such systems suffer from the disadvantage that output pulse amplitudes from the laser may be highly variable and unpredictable, so a large amount of amplitude noise is likely to be created which reduces the ability of the gas velocity sensor to resolve small variations in air flow velocity.

Furthermore, temperature variations in either the laser or the interferometer may cause false indications of air velocity. These false indications are caused either by a change in the interferometer due to thermal expansion, thus giving an inaccurate measurement, or by changes in the frequencies of the modes of the laser itself.

SUMMARY OF THE INVENTION

According to the present invention there is provided a gas velocity sensor including: an electromagnetic radiation source operable to generate transmitted radiation having an expected transmission frequency; a backscattered radiation detection arrangement for determining a Doppler shifted frequency of backscattered radiation from a gas; and an arrangement for determining the gas velocity in dependence upon the Doppler shifted frequency and upon the expected transmission frequency wherein the sensor further includes: a compensation detection arrangement for detecting any difference between the measured frequency of the transmitted radiation and the expected transmission frequency and generating a feedback signal therefrom; and a feedback path connecting said feedback signal to said arrangement for determining gas velocity in dependence upon the Doppler shifted frequency.

The measured transmission frequency may be different from the expected transmission frequency due to due to actual changes in the frequency or due to changes in the characteristics of the measuring apparatus.

In an exemplary embodiment the backscattered radiation detection arrangement includes an interferometer, a backscatter spatial filter and a backscatter photodetector, and in which the interferometer is positioned in an optical path between the gas and the backscatter spatial filter, the interferometer receiving the backscattered radiation and producing an interference pattern when radiation is transmitted and backscattered; the backscatter spatial filter is positioned in an optical path between the interferometer and the backscatter photodetector, the backscatter spatial filter having a structure of transparent and opaque regions corresponding to said interference pattern such that changes in frequency of the backscattered radiation cause changes in the intensity of light detected by the backscatter photodetector.

Similarly in an exemplary embodiment the compensation detection arrangement includes the interferometer, a compensation spatial filter and a compensation photodetector, and in which the interferometer receives at least some of the transmitted radiation and produces an interference pattern when radiation is transmitted; the compensation spatial filter is positioned in an optical path between the interferometer and the compensation photodetector, the compensation spatial filter having a structure of transparent and opaque regions corresponding to said interference pattern such that changes in measured frequency of the transmitted radiation cause changes in the intensity of light detected by the compensation photodetector.

Although a Fabry-Perot interferometer is used in an exemplary embodiment, other interferometers may be employed. Essentially any interferometer that produces an interference pattern that can be replicated on a spatial filter is appropriate.

A movable reflector may be employed in the Fabry-Perot interferometer. As is well known, Fabry-Perot interferometers contain a pair of facing reflectors that bounce electromagnetic radiation off one another. Having at least one of the reflectors movable allows the separation between the reflectors to be varied: varying their separation alters the interference pattern they produce. The Fabry-Perot interferometer may further include an electromechanical actuator operable to move the moveable reflector, such as a piezoelectric device or the like.

The electromagnetic radiation may be generated in pulses, and the sensor further includes a waveform generator arranged in operation to generate a driving waveform to drive the electromechanical actuator, the driving waveform including: a first voltage level defined such that when applied to the electromechanical actuator the average light power per pulse received by the backscatter photodetector should be substantially equal to half its maximum value; and a second voltage level different from said first voltage level defined such that when applied to the electromechanical actuator the average light power per pulse received by the backscatter photodetector should be substantially equal to half its maximum value; and the backscattered radiation detection arrangement includes an arrangement for generating a measured Doppler shifted frequency of backscattered radiation in dependence upon the average light power per pulse detected by the backscatter photodetector when driven with said driving waveform.

The driving waveform may further include: a third voltage level defined such that when applied to the actuator the average light power received by the compensation photodetector should be substantially equal to half its maximum value; and a fourth voltage level different from said third voltage level defined such that when applied to the actuator the average light power received by the compensation photodetector should be substantially equal to half its maximum value; and the compensation detection arrangement generates said feedback signal in dependence upon the light power detected by the compensation photodetector when driven with said driving waveform.

The waveform may include continuous repetitions of: the first voltage level; the third voltage level; the fourth voltage level; the second voltage level; the fourth voltage level; and the third voltage level, for example at 20 cycles per second.

A summing amplifier may be used to add a signal dependent upon the feedback signal to the driving waveform prior to driving the electromechanical actuator such that the feedback signal tends towards zero. This means that the Doppler shifted frequency is thus independent of shift in laser frequency and in temperature of the measuring device.

It is also desirable to have an arrangement for measuring the amplitude of the transmitted radiation and there may be an arrangement for modifying the output of the backscatter photodetector and or the compensation photodetector in dependence upon the measured amplitude in order to provide a signal which is independent of the measured amplitude.

According to a second aspect of the invention, there is provided a method of determining gas velocity including the steps of: generating transmitted radiation having an expected transmission frequency; detecting backscattered radiation; and determining gas velocity in dependence upon any Doppler shift of the frequency of the backscattered radiation; wherein the method further includes the steps of: determining a transmission frequency of the transmitted radiation; detecting any difference between the measured transmission frequency and the expected transmission frequency and generating a feedback signal therefrom; and in which the step of determining gas velocity is further in dependence upon said feedback signal.

In an exemplary embodiment the step of detecting backscattered radiation includes the sub-steps of: passing at least some of the backscattered radiation through an interferometer to produce an interference pattern; passing the output of the interferometer through a backscatter spatial filter having a structure of transparent and opaque regions corresponding to said interference pattern; and detecting the output from the spatial filter with a backscatter photodetector.

Similarly, in an exemplary embodiment the step of determining the transmission frequency of the transmitted radiation includes the sub steps of: passing at least some of the transmitted radiation through said interferometer to produce an interference pattern; passing the output of the interferometer through a compensation spatial filter having a structure of transparent and opaque regions corresponding to said interference pattern; and detecting the output from the compensation spatial filter with a compensation photodetector.

The interferometer, for example a Fabry-Perot interferometer, may include a pair of reflectors at least one of which is moveable, the method further including the step of moving at least one reflector so that the separation between the reflectors is varied and measuring the output of the photodetector at a plurality of reflector separations.

The step of determining gas velocity in dependence upon any Doppler shift of the frequency of the backscattered radiation may include the sub-steps of: setting a first reflector separation such that the average light power per pulse received by the backscatter photodetector should be substantially equal to half its maximum value; detecting a first average light power Q1 received by the photodetector setting a second reflector separation different from said first separation such that the average light power per pulse received by the backscatter photodetector should be substantially equal to half its maximum value; detecting a second average light power Q2 received by the photodetector; and generating a quantity R proportional to any Doppler shift according to the equation:

$$R=(Q1-Q2)/(Q1+Q2);$$

and determining the gas velocity in dependence upon said quantity R.

The step of generating a feedback signal may include: setting a third reflector separation such that the average light power per pulse received by the compensation photodetector should be substantially equal to half its maximum value; detecting an average light power P1 received by the compensation photodetector setting a fourth reflector separation different from said third separation such that the average light power per pulse received by the compensation photodetector should be substantially equal to half its maximum value; detecting an average light power P2 received by the compensation photodetector; and generating a quantity S proportional to any detected difference according to the equation:

$$S=(P1-P2)/(P1+P2); \text{ and}$$

generating said feedback signal in dependence up said quantity S.

In each case the quantities R and/or S may be calculated several times and an average value generated.

The reflector separation may be dependent upon said feedback signal.

It is also desirable to measure the amplitude of the transmitted radiation and to determine gas velocity in dependence upon any Doppler shift of the frequency of the backscattered radiation and/or to generate the feedback signal in dependence upon the measured amplitude.

DETAILED DESCRIPTION

Exemplary embodiments of the present invention will now be described in more detail, by way of example only, with reference to the accompanying drawings.

Figure 1:
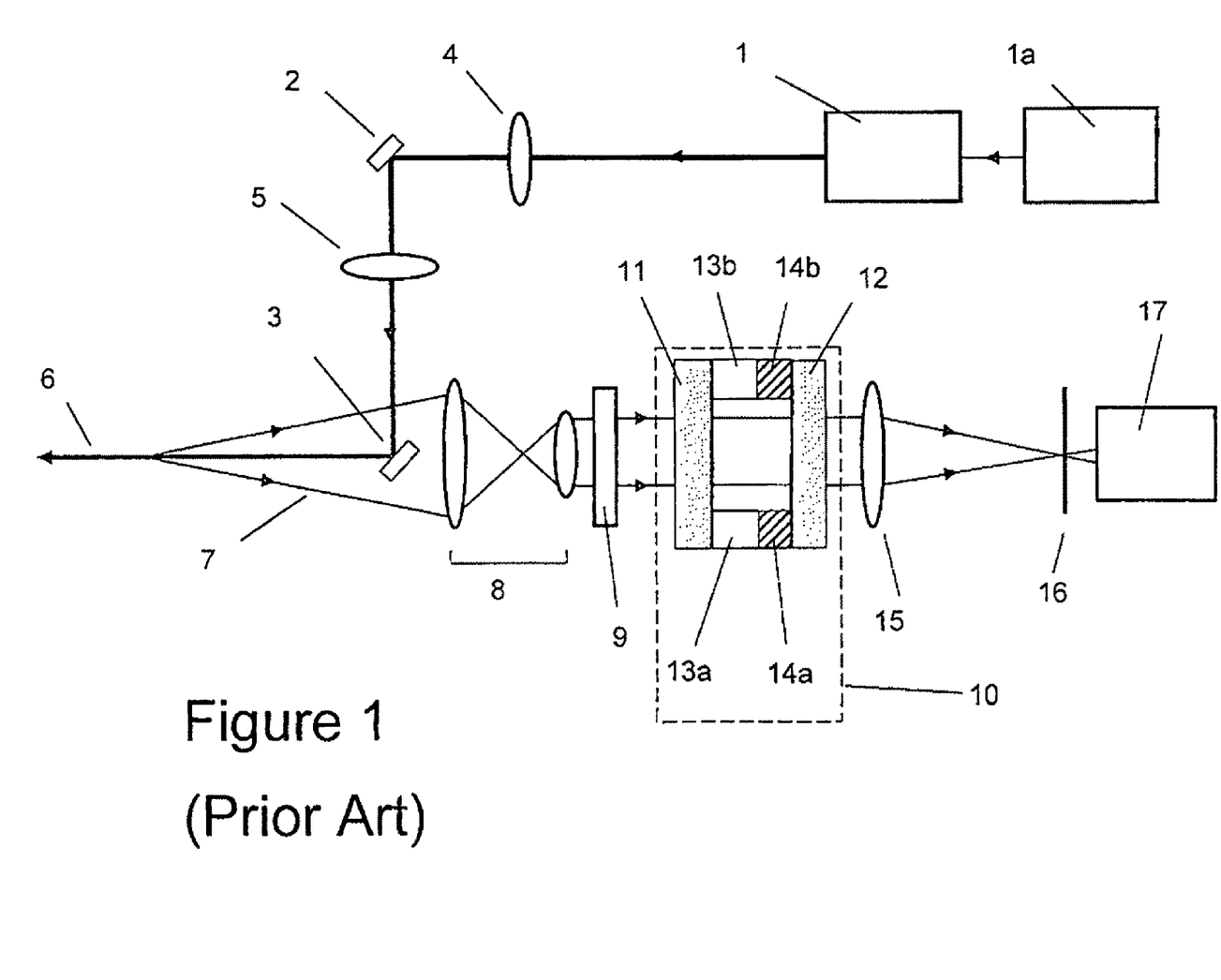
FIG. 1 is an illustration of a known gas velocity sensor.

The operation of a known gas velocity sensor is now described in outline by reference to FIG. 1. In operation, a single-frequency or multi-frequency laser 1, operated by a control unit 1a, is projected via mirrors 2, 3 and lenses 4, 5 as a collimated beam 6 into flowing air. A small amount of light 7 is scattered backwards along the beam path, and is collected and approximately collimated by a telescope 8. The collected light passes through a narrow-band filter 9 to remove most of the background daylight, and then through an interferometer including a Fabry-Perot etalon 10 consisting of two partially reflecting plates 11 and 12 separated by precision spacers 13a, 13b etc. Typically three spacers are used, equally positioned around the periphery of the plates 11 and 12, although only two are shown in FIG. 1 for convenience. The spacers 13a, 13b are designed to maintain the two partially reflecting surfaces of the plates 11, 12 parallel to one another to an accuracy substantially less than the wavelength of the laser light. The spacers 13a, 13b etc. contain piezoelectric devices 14a, 14b etc. which change their length by precisely controlled amounts in response to applied electrical voltages, enabling the spacing between the partially reflecting surfaces of the plates 11 and 12 to be changed by several wavelengths of the laser light without changing the parallelism of the surfaces.

Backscattered light passing through the etalon 10 is collected by a lens 15, passed through a mask 16 located in the focal plane of the lens 15 and on to a photomultiplier 17. The photomultiplier 17 is used because it has high sensitivity at the UV wavelength of interest and delivers a high output voltage. As an alternative to the photomultiplier 17, an avalanche photodiode in conjunction with an additional amplifier may equally well be used. The light in the plane of the mask 16 is in the form of circular interference fringes formed by multiple reflections of the backscattered light between the partially reflecting surfaces of the plates 11 and 12. The mask 16 has a series of concentric apertures which closely match the shape of the fringes generated by light at a predetermined frequency, which may be at the frequency of light as output by the laser 1. The diameters of the fringes are characteristic of the frequency of the backscattered light, so changes in the frequency caused by the Doppler shift due to moving air molecules causes a change in fringe diameter, and hence a change in the light intensity passing through the mask 16 onto the photomultiplier 17. The velocity of air movement can therefore by measured in terms of the change of intensity of light detected by the photomultiplier 17.

The laser 1 is typically a pulsed, Q-switched laser, for example a diode-pumped neodymium—YAG or neodymium—$YVO_4$ laser operating at a wavelength of 1064 nm, with non-linear crystals in the path of the output beam which triple the frequency of the radiation to produce an ultraviolet wavelength of 354.7 nm. The laser 1 may be a single-frequency laser containing frequency selective optics within the laser cavity to suppress operation at all frequencies except the desired frequency. Such lasers are expensive to produce owing to their complexity, so it is economically advantageous to use a simpler multi-frequency laser operating on a number of axial modes of the laser cavity simultaneously. Such a laser may be used provided that the spacing of the two partially reflective surfaces of the plates 11 and 12 is adjusted to a value equal to c/2f, where c is the velocity of light in air, and f is the frequency spacing between the axial modes of the laser 1. When this spacing is achieved, all the axial mode frequencies produced by the laser 1 produce circular fringe patterns of identical shape and size in the plane of the mask 16, so the instrument operates as if the laser 1 were producing light of a single frequency only.

A characteristic of multi-mode lasers is that the output pulse amplitudes are likely to be highly variable and unpredictable, so a large amount of amplitude noise is created in the photomultiplier 17 which reduces the ability of the sensor to resolve small variations in air flow velocity.

In an exemplary embodiment of the present invention, the problem of amplitude noise in the prior art instrument of FIG. 1 may be remedied by a technique that will now be described with reference to FIG. 2, in which features in common with FIG. 1 retain the same reference numerals.

Figure 2:
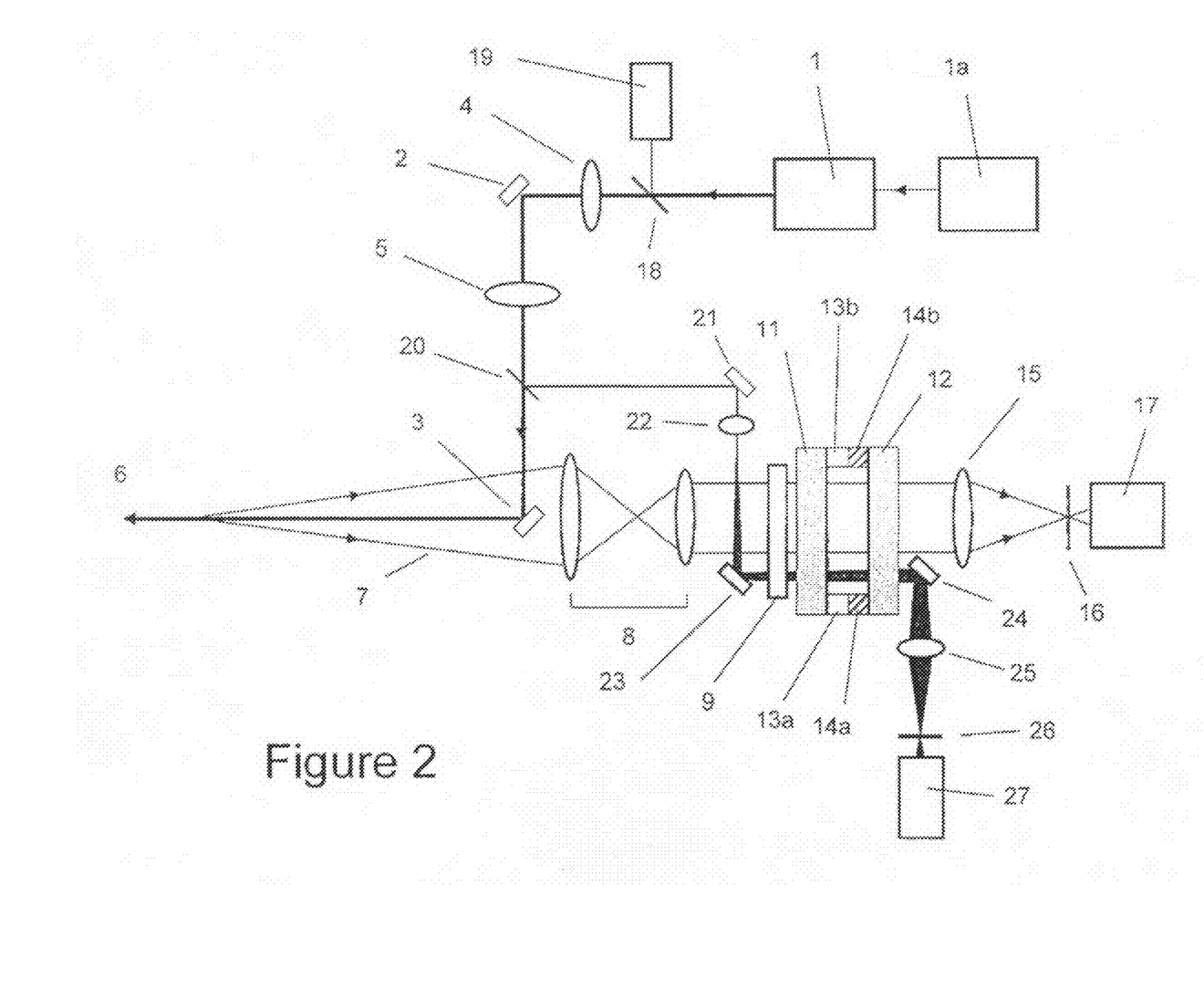
FIG. 2 is an illustration of a gas velocity sensor according to the present invention.

Referring to FIG. 2, the output amplitude of laser pulses emerging from the laser 1 are measured by a beamsplitter 18 and a photodiode 19. The beamsplitter 18 diverts a small fraction of the output of the laser 1 into the photodiode 19 which produces a photocurrent corresponding to the power in each laser pulse. Dividing the value of the pulse current produced by the photomultiplier 17 by the value of the photocurrent produced by the photodiode 19 produces a ratio which depends of the amount of backscatter from the atmosphere, and is independent of the amplitude of the laser pulses. The excess noise created by the variation in amplitude of pulses from the laser 1 is consequently greatly reduced, and greater sensitivity to air flow velocity can be achieved.

Temperature variations in either the laser 1 or the Fabry-Perot etalon 10 cause the diameters of interference fringes in the plane of the mask 16 to vary, giving false indications of air velocity. This variation is caused either by a change in the spacing between the reflective surfaces of the plates 11 and 12 through thermal expansion of the spacers 13a, 13b etc, or by changes in the frequencies of the modes of the laser 1. Such variations can be removed in a temperature compensation sub-system by passing a portion of the output of the laser 1 directly through the Fabry-Perot etalon 10, as shown in FIG. 2, and measuring changes in the power of the transmitted beam. The temperature compensation sub-system includes a beamsplitter 20 for diverting a small fraction of the laser beam power via a mirror 21, a lens 22 and a mirror 23 through one side of the Fabry-Perot etalon 10. This beam may be directed near the edge of the optical aperture of the etalon 10 so that it does not obscure the main beam 7 arising from atmospheric backscatter. The temperature compensation sub-system further includes a plane mirror 24 for directing light emerging from the edge of the etalon 10 into a lens 25 which focuses the light onto a mask 26 before being detected by a photodiode 27.

The laser beam entering the etalon 10 is arranged to diverge significantly by the action of the lens 22, typically covering an angular range of 15 milliradians or more, so that a group of concentric interference fringes form in the focal plane of the lens 25 where the mask 26 is located. These fringes are caused by the interference between multiple reflections between the reflective surfaces of the plates 11 and 12. The mask 26 has a concentric pattern of apertures matching a predetermined concentric fringe pattern, so the amount of light transmitted by the mask 26 onto the photodiode 27 varies with the fringe diameter, and hence with the frequency of light from the laser 1. Temperature variations of the etalon 10 cause changes in the spacing between the partially reflecting surfaces of the plates 11 and 12 through thermal expansion of the spacers 13a, 13b etc., consequently causing changes in the diameter of the interference fringes in the plane of the mask 26. The pattern of fringes of the mask 26 may correspond to an interference pattern generated by light at the frequency output by the laser 1 and at an initial predetermined temperature of the laser 1 and/or the etalon 10. The resulting change in photocurrent in the photodiode 27 provides a measure of the temperature change, and may be used to generate a feedback voltage to the etalon 10 to correct the change in spacing between the reflecting plates 11 and 12. To do this, the change in photocurrent from the photodiode 27 is amplified to provide a feedback voltage that may be applied to the piezoelectric spacers 14a, 14b etc. to counteract the change in fringe diameter, so that the diameter of the fringes remains substantially unaffected by changes in temperature. The fringe diameter also remains substantially unaffected by changes in the output frequencies of the laser 1, so the feedback mechanism compensates for both temperature change and laser frequency change.

The photodetectors 19 and 27 may equally well be photomultipliers instead of photodiodes, but there is no particular need to use high-sensitivity (and relatively high cost) devices such as photomultipliers in these roles.

Pulse amplitudes generated by the three photodetectors 17, 19 and 27 in response to control voltages applied to the piezoelectric spacers 14a, 14b etc. provide the data from which the air velocity is calculated, and the data which enables corrections for variations in laser frequency and temperature to be applied. An exemplary method of calculation will now be described with reference, additionally, to FIG. 3.

Figure 3:
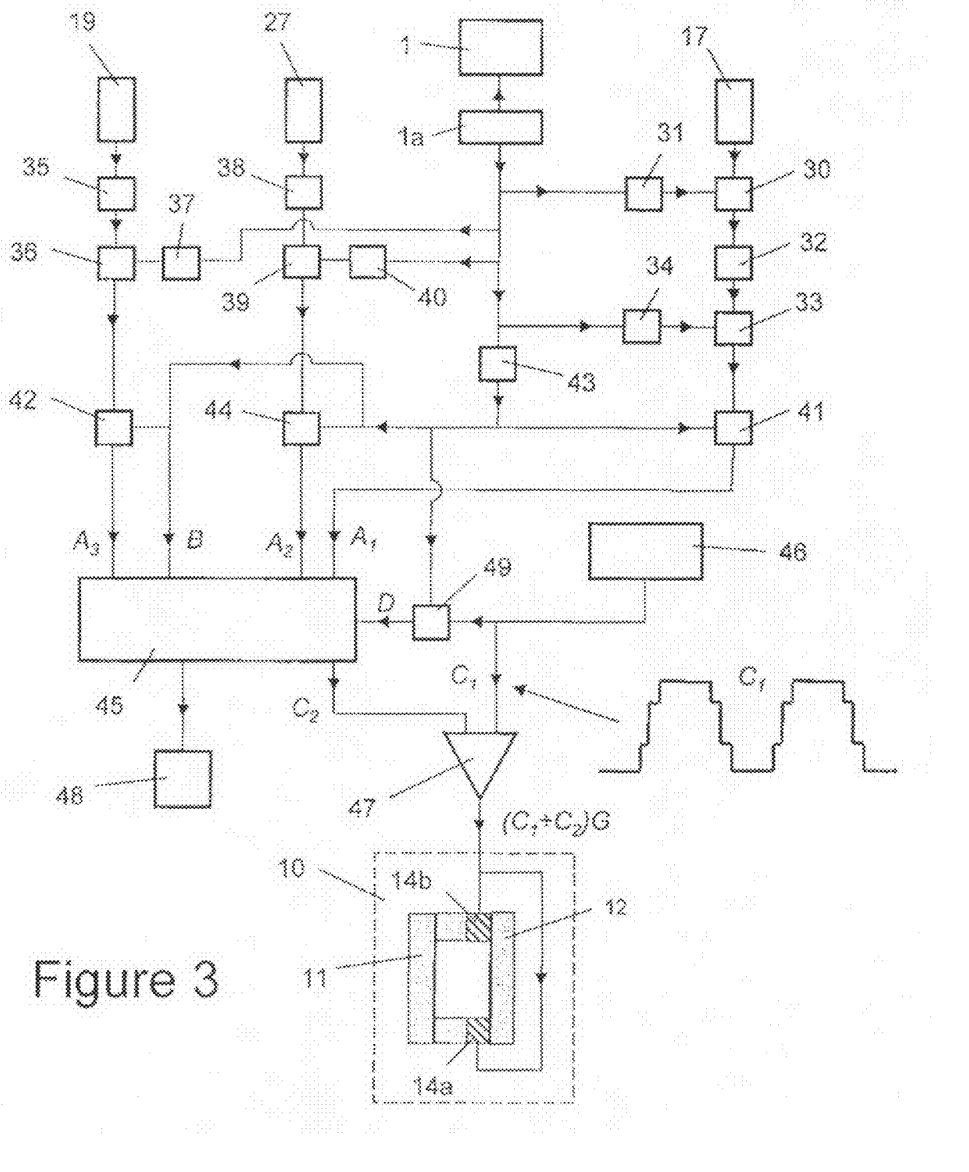
FIG. 3 is a diagram illustrating how the signals are processed in the present invention.

Backscattered light from the atmosphere is detected by the photomultiplier 17 creating a current pulse which passes through an electronic gate 30. The gate 30 is opened by a short pulse of a predefined duration generated by a pulse generator 31 which is triggered by Q-switch trigger pulses generated in a laser power supply and control unit 1a. The pulse generator 31 contains a delay circuit which delays the opening time of the gate 30 so that it only passes the photocurrent from the photomultiplier 17 corresponding to a prescribed range of distances along the path of the laser beam 6 in FIG. 2. As an example, the gate 30 may open only to pass photocurrent arising from a range of distances between 10 and 15 metres from the aircraft, and may reject photocurrent from all other ranges. To do this, the pulse generator 31 generates a pulse of 33 nanoseconds duration in response to trigger pulses from the control unit 1a delayed by 66 nanoseconds. In this case the sensor system will only measure the air velocity within this prescribed range of distance from the aircraft. By gating out photocurrent arising from all other ranges, the gate 30 also rejects photocurrent arising from light scattered from optical components within the system such as the mirror 3, which causes unwanted background noise, and also rejects photocurrent arising from light scattered by distant objects such as trees, buildings or clouds along the path of the beam 6. It also rejects the majority of photocurrent arising from sunlight passing into the aperture of the telescope 8 which would otherwise also contribute to background noise.

Current passing through the gate 30 is integrated by an integrator 32 which provides an output voltage proportional to the total charge passed by the gate 30. This is sampled by a sample-and-hold circuit 33 which is triggered by trigger pulses from the laser control unit 1a via a delay circuit 34. The delay time created by the circuit 34 allows sufficient time for the integrator 32 to fully integrate the output pulse from the gate 30, and may for example be 100 nanoseconds. The output from the sample-and hold circuit 33 then passes to an analogue-to-digital (A/D) converter 41 which is activated by trigger pulses from the laser control unit 1a delayed by a delay circuit 43. The delay by the delay circuit 43 must be longer than the delay by the delay circuit 34, for example 1 microsecond. The digital output from the ND converter 41, which is labelled $A_1$ in FIG. 3, is passed to a computer 45. The output from the delay circuit 43, which is a two-state binary waveform, is also input to the computer 45, and is labelled B in FIG. 3.

The output from the photodiode 19, which monitors the amplitudes of pulses from the laser 1, is passed through an integrator 35 which produces an output voltage proportional to the total charge generated by the laser pulse, and is therefore proportional to the laser pulse energy. This is sampled by a sample-and-hold circuit 36 which is activated by Q-switch trigger pulses from the laser control unit 1a via a delay circuit 37. The delay circuit 37 introduces sufficient delay to allow time for the integrator 35 to fully integrate the photocurrent from the photodiode 19, which delay may be 100 nanoseconds for example. The output from the sample-and-hold circuit 36 then passes to an ND converter 42 which is activated by the same trigger pulses as those activating the ND converter 41. The digital output from the ND converter 42, which is labelled $A_3$ in FIG. 3, is passed to the computer 45.

The output from the photodiode 27, which measures the laser pulse output from the temperature compensation subsystem, is passed through an integrator 38 which produces an output voltage proportional to the total charge generated by the photodiode 27. This is sampled by a sample-and-hold circuit 39 which is activated by Q-switch trigger pulses from the laser control unit 1a via a delay circuit 40. The delay circuit 40 introduces sufficient delay to allow time for the integrator 38 to fully integrate the photocurrent from the photodiode 27, which delay may be 100 nanoseconds for example. The output from the sample-and-hold circuit 39 then passes to an ND converter 44 which is activated by the same trigger pulses as those activating the ND converter 41. The digital output from the ND converter 44, which is labelled $A_2$ in FIG. 3, is passed to the computer 45.

The integrators 32, 35 and 38 are reset between laser pulses, so that only the charge from each individual laser pulse is integrated and sampled. Typically the laser pulse width is short relative to the pulse repetition rate, so that this can be achieved by adding resistance across the integrators. For higher repetition rates the integrators 32, 35, 38 may be reset using an electronic switch triggered by trigger pulses from the laser control unit 1a via a delay circuit.

Figure 4:
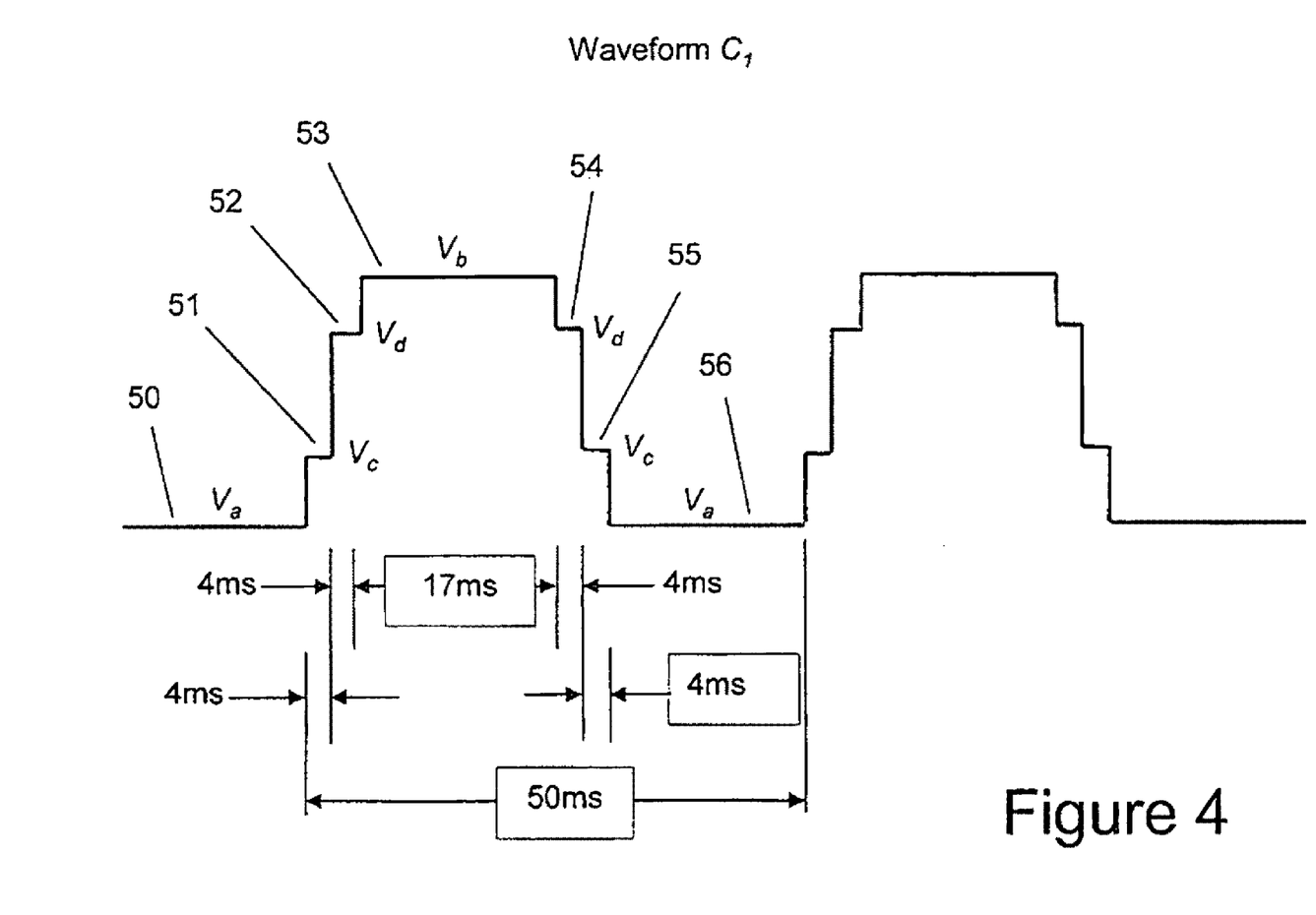
FIG. 4 shows a waveform generated by a waveform generator shown in FIG. 3 for driving an interferometer in the present invention.

A waveform generator 46 generates a waveform $C_1$, shown in detail in FIG. 4. The waveform $C_1$ is a free-running periodic waveform, typically having a repetition frequency of 20 cycles per second, which is used to alter the spacing between the reflective plates 11 and 12 in the Fabry-Perot etalon 10, thus altering its frequency of maximum optical transmission. The waveform $C_1$ includes 4 voltage levels $V_a$, $V_b$, $V_c$ and $V_d$ which are switched in sequence. These voltages are amplified by an amplifier 47 and then applied to the piezoelectric elements 14a, 14b etc to adjust the spacing between the reflective plates 11 and 12 in the etalon 10. Typical values for the durations of the various segments in the waveform $C_1$ are shown in FIG. 4. The voltages $V_a$ etc, and the gain G of the amplifier 47 are adjusted so that the transmissions of interference fringes created by the etalon 10 through the masks 16 and 26 onto the photodetectors 17 and 27 have the approximate values shown in FIG. 5.

Figure 5:
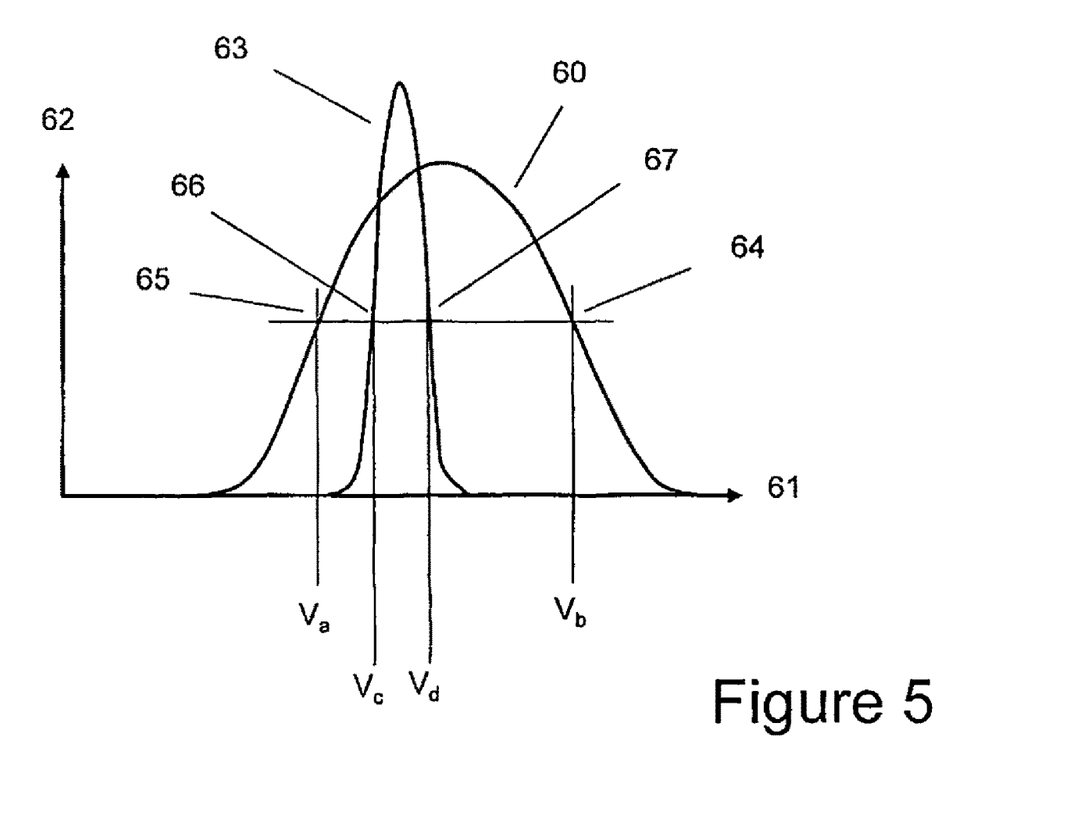
FIG. 5 is a schematic illustration showing how the intensity of a transmitted pulse and of a backscattered pulse varies across a range of frequencies.

Referring to FIG. 5, an axis 61 represents the voltage of waveform $C_1$, and an axis 62 represents the average light power per pulse received on either the photomultiplier 17 or the photodiode 27. A curve 60 represents the average light power received per pulse by the photomultiplier 17, as the voltage input to the amplifier 47 in increased, and a curve 63 represents the average light power received per pulse by the photodiode 27 as the voltage input to the amplifier 47 in increased. The broad peak in the curve 60 arises because of the broad interference fringes created by backscatter from atmospheric molecules, which typically have a spectral width of about 4 GHz between half-power points. A narrow peak in the curve 63 arises because of the comparatively narrow spectrum of the laser pulses, which is typically 1 GHz between half-power points. During a portion 50 (shown in FIG. 4) of the waveform $C_1$, when it has the value $V_a$, the average light power per pulse received by the photomultiplier 17 corresponds to a point 65 on the curve 60, which is roughly half its maximum value. When the waveform $C_1$ reaches a portion 51 it switches to the value $V_c$ corresponding to a point 66 on the curve 63 at which the average light power per pulse received by the photodiode 27 has approximately half its maximum value. When the waveform $C_1$ reaches a portion 52 it switches to voltage $V_d$, corresponding to a point 67 on the curve 63 at which: the average light power per pulse on the photodiode 27 also has approximately half its maximum value, but on the opposite side of the peak of the curve 63 to the point 66. When the waveform $C_1$ reaches a portion 53, it switches to a voltage $V_b$, corresponding to point 64 on the curve 60 at which the average power per pulse received by the photomultiplier 17 also has approximately half its maximum value, but on the opposite side of the peak of the curve 60 to the point 65. The waveform $C_1$ then cycles through the portions 54, 55 and 56, with voltages $V_d$, $V_c$ and $V_a$ respectively to complete the full cycle. The waveform $C_1$ is input to an ND converter 49, which is activated by the same trigger pulse used to activate the A/D converters 41, 42 and 44, and the output from the A/D converter 49, which is labelled D in FIG. 3, is fed to the computer 45.

The digital inputs to the computer 45 therefore consist of values $A_1$, $A_2$ and $A_3$, representing respectively the integrated values of the backscatter power per pulse from the photomultiplier 17, the integrated value of the laser pulse power from the photodiode 27 of the temperature compensation sub-system and the integrated value of the laser pulse power from the photodiode 19. Digital values D representing the voltages in the waveform $C_1$, and B representing laser trigger pulses from the Q-switch are also applied. The output from the computer 45 is an analogue voltage $C_2$, obtained from a digital-to-analogue converter (not shown in FIG. 3), which is applied as a control voltage to the summing input of the amplifier 47, in addition to waveform $C_1$, to vary the control voltage applied to the piezoelectric spacers 14a, 14b etc on the etalon 10. An output from the computer 45 is also provided to show the value of the air velocity on a display 48.

The temperature compensation sub-system operates as follows.

The digital inputs $A_1$, $A_2$, $A_3$, and D for each laser pulse are clocked into the computer 45 memory buffer by trigger pulses B from the laser control unit 1a. The computer 45 processes the data at the computer clock frequency, which is much higher than the laser pulse repetition rate, allowing continuous data buffering and processing with no loss of laser pulse data. The laser 1 operates typically at 50,000 pulses per second, whereas the computer clock frequencies are typically many megahertz. The digital input D is used to define the times at which the waveform $C_1$ changes between voltages $V_a$, $V_b$, $V_d$ and $V_d$, hence mapping the waveform $C_1$ into the computer memory.

Following a transition from portion 50 to portion 51 ($V_a \rightarrow V_c$) in the waveform $C_1$, the computer 45 skips the data for the next 20 laser pulses approximately, and then sums the quotients $A_2/A_3$ until the next transition, in this case from portion 51 to portion 52, corresponding approximately to 120 laser pulses, and stores the result as a quantity labelled $P_1$. Skipping of the initial 20 pulses allows time for the etalon 10 to stabilize at its new spacing following the voltage transition applied to the piezoelectric elements 14a, 14b etc. It then performs the same procedure following the transition from portion 51 to portion 52 ($V_c \rightarrow V_d$), resulting in a second quantity labelled $P_2$. Similar quantities labelled $P_3$ and $P_4$ are generated following transitions from portions 53 to 54 and portions 54 to 55 respectively. A quantity $S=\frac{1}{2}(Te_1+Te_2)$ is then generated, where $Te_1=(P_2-P_1)/(P_2+P_1)$, and $Te_2=(P_3-P_4)/(P_3+P_4)$ which represents the average difference in amplitudes from points 66 and 67 on the curve 63, and hence represents the detuning of the etalon 10 from its nominal centre frequency, either as a result of temperature variations or laser frequency change. The quantity S is scaled appropriately, and then applied to a digital-to-analogue converter to generate the output voltage $C_2$.

The voltage $C_2$ is applied as an input to the summing amplifier 47 in addition to the waveform $C_1$, so that the amplifier 47 creates an output voltage (C1+C2)G where G is a fixed value of amplifier gain. This output voltage is applied to the piezoelectric elements 14a, 14b etc. in the etalon 10 to adjust the spacing between the reflective plates 11 and 12. The feedback loop thus created stabilizes in a condition where the value of S is substantially zero, and hence the average difference in amplitudes from points 66 and 67 on the curve 63 is substantially zero. The feedback loop ensures that it remains in this condition regardless of changes in temperature and laser frequency.

Following the transition from portion 52 to portion 53 ($V_d \rightarrow V_b$), the computer 45 skips the data for the next 20 laser pulses approximately, and then sums the quotients $A_1/A_3$ until the next transition, in this case from portion 53 to portion 54, involving a total of 800 laser pulses approximately, and stores the result as a quantity labelled $Q_1$. Skipping the first 20 laser pulses allows time for the etalon 10 to stabilize at its new spacing following the voltage transition applied to the piezoelectric elements 14a, 14b etc. It then performs the same procedure following the transition from portions 55 to 56 ($V_c \rightarrow V_a$), resulting in a second quantity labelled $Q_2$. The quantity $R=(Q_1-Q_2)/(Q_1+Q_2)$ is then generated, which represents the average difference in amplitudes between points 65 and 64 on the curve 60, and hence represents the detuning of backscatter spectrum 60 from its nominal centre frequency. The quantity R is therefore proportional to the Doppler shift in frequency of the backscatter spectrum, which is proportional to the component of air velocity in a direction parallel to the laser beam 6 in FIG. 1.

During a calibration procedure, the quantity R is measured when the air velocity is zero, giving a value $R_0$. The value of R is also measured when the air velocity in the direction of the laser beam 6 has a known, measured value Vc, giving a value $R_{Vc}$. In any subsequent measurement, the value of air velocity V can be calculated from the equation $$V = \frac{R - R_0}{R_{Vc} - R_0} \cdot Vc \qquad \text{Equation (1)}$$

This value of air velocity is calculated in the computer 45 and displayed on the display 48. The accuracy of the measurement may be increased by averaging air velocity values V from a number of cycles of the waveform $C_1$ and displaying the average result on the display 48 rather than individual values.

The value of air velocity from Equation (1) is calculated on the assumption of a linear relationship between R and air velocity V. This only applies when the value of Doppler shift in the frequency of backscattered light due to air velocity is small in comparison with the overall width of the backscatter spectrum represented by the curve 60 in FIG. 5. For example, the Doppler shift has a value 5.64 megahertz per metre per second of air velocity, assuming a laser frequency of 354.7 nanometres, whereas the full width of the backscatter spectrum represented by the curve 60 has a value of 4000 megahertz approximately. The linear approximation represented by Equation (1) may therefore be used up to air velocities of approximately 100 metres per second without introducing significant errors.

Higher air velocities can be reliably measured if the nonlinearity in the relationship between R and V is included in the equation. This can be achieved by calibrating the sensor over a wide range of velocities, using for example a high velocity wind tunnel. If the sensor gives a series of output values $R_1$, $R_2$, $R_3$ etc. for air velocities $V_1$, $V_2$, $V_3$ etc, then a nonlinear calibration curve can be stored in the computer 45 based on this data, and accurate values for air velocity V may be obtained for any given value of R by interpolation between the calibration points.

This nonlinear interpolation method may be used up to air velocities of approximately 300 metres per second, that is to say, approximately the velocity of sound in air at sea level. However, high-performance aircraft operating at speeds well beyond the velocity of sound will require an alternative method for air velocity calculation.

This can achieved by noting that the temperature and laser frequency are likely to be quantities varying slowly with time, so the control voltage $C_2$ varies little between one cycle of the waveform $C_1$ and the next. The temperature control feedback loop may therefore be temporarily disabled to enable large values of air velocity to be measured.

Before disabling the feedback loop, the computer 45 first takes note of the value of the control voltage $C_2$. It then applies a larger fixed voltage $C_3$ in place of $C_2$ to the input of the amplifier 47. The values of $P_1$ and $P_2$ are then measured on the following cycle of the waveform $C_1$. If $P_1$ and $P_2$ are of roughly comparable size, and roughly equal to half the peak amplitude of the curve 60, then the nonlinear interpolation method is used to calculate a value for the air velocity. If $P_1$ and $P_2$ are widely different, then a larger value of voltage is applied in place of $C_2$ to the input of the amplifier 47 and a further set of values for $P_1$ and $P_2$ are calculated during the following cycle of the waveform $C_1$. The process is repeated until $P_1$ and $P_2$ are comparable, and a corresponding value for velocity is calculated by the interpolation method described above. For convenience this velocity is referred to as the intermediate velocity $V_i$. A correction is then applied to the velocity $V_i$ to take account of the temperature correction $C_2$ and the voltage $v_c$ applied to the input of the amplifier 47. To achieve this, a prior calibration of the etalon 10 and the amplifier 47 is needed to establish the relationship between voltage $v_c$ and the resulting shift in the resonance frequency of the etalon 10. If this calibration factor is K hertz per volt, then the actual air velocity V is calculated from the following equation:

$$V = \frac{\lambda K}{2}(v_c - C_2) + V_i \quad \text{Equation (2)}$$

where $\lambda$ is the wavelength of light from the laser 1. This procedure may be repeated over a number of cycles of waveform $C_1$ in order to improve the accuracy of air velocity measurement. During this process, the temperature control feedback loop may be periodically reconnected to obtain more accurate, updated values for the temperature control voltage $C_2$.

It will be readily apparent to those skilled in the art that variations to the above described embodiment are possible without departing from the scope of the invention defined in the appended claims.

The invention claimed is:

1. A gas velocity sensor, comprising:
   an electromagnetic radiation source operable to generate transmitted radiation having an expected transmission frequency;
   a backscattered radiation detection arrangement for determining a Doppler shifted frequency of backscattered radiation from a gas; and
   an arrangement for determining the gas velocity in dependence upon the Doppler shifted frequency and upon the expected transmission frequency;
   wherein the sensor further includes a compensation detection arrangement for detecting any difference between the measured frequency of the transmitted radiation and the expected transmission frequency and generating a feedback signal therefrom, and a feedback path connecting the feedback signal to the arrangement for determining gas velocity in dependence upon the Doppler shifted frequency.

2. The gas velocity sensor according to claim 1, wherein:
   the backscattered radiation detection arrangement includes an interferometer, a backscatter spatial filter and a backscatter photodetector,
   the interferometer is positioned in an optical path between the gas and the backscatter spatial filter, the interferometer receiving the backscattered radiation and producing an interference pattern when radiation is transmitted and backscattered, and
   the backscatter spatial filter is positioned in an optical path between the interferometer and the backscatter photodetector, the backscatter spatial filter having a structure of transparent and opaque regions corresponding to a predetermined interference pattern such that changes in frequency of the backscattered radiation cause changes in the intensity of light detected by the backscatter photodetector.

3. The gas velocity sensor according to claim 2, further comprising:
   an arrangement for measuring the amplitude of the transmitted radiation and an arrangement for modifying the output of the backscatter photodetector in dependence thereon.

4. The gas velocity sensor according to claim 3, wherein:
   the compensation detection arrangement includes the interferometer, a compensation spatial filter and a compensation photodetector,
   the interferometer receives at least some of the transmitted radiation and produces an interference pattern when radiation is transmitted, and
   the compensation spatial filter is positioned in an optical path between the interferometer and the compensation photodetector, the compensation spatial filter having a structure of transparent and opaque regions corresponding to a further predetermined interference pattern such that changes in measured frequency of the transmitted radiation cause changes in the intensity of light detected by the compensation photodetector.

5. The gas velocity sensor according to claim 4, further comprising:
   an arrangement for measuring the amplitude of the transmitted radiation and an arrangement for modifying the output of the compensation photodetector in dependence thereon.

6. The gas velocity sensor according to claim 2, wherein the interferometer is a Fabry-Perot interferometer.

7. The gas velocity sensor according to claim 6, wherein the Fabry-Perot interferometer has a movable reflector.

8. The gas velocity sensor according to claim 7, wherein the Fabry-Perot interferometer further includes an electromechanical actuator operable to move the moveable reflector.

9. The gas velocity sensor according to claim 8, further comprising:
a control arrangement for triggering emission of radiation by the electromagnetic radiation source in the form of pulses, and a waveform generator operable in response to trigger signals from the control arrangement to generate a driving waveform to drive the electromechanical actuator, the driving waveform including a first voltage level defined such that when applied to the electromechanical actuator the average light power per pulse received by the backscatter photodetector should be substantially equal to half its maximum value, and a second voltage level different from the first voltage level defined such that when applied to the electromechanical actuator the average light power per pulse received by the backscatter photodetector should be substantially equal to half its maximum value,
wherein the backscattered radiation detection arrangement includes an arrangement for generating a measured Doppler shifted frequency of backscattered radiation in dependence upon the average light power per pulse detected by the backscatter photodetector when driven with the driving waveform.

10. The gas velocity sensor according to claim 9, wherein the driving waveform further includes a third voltage level defined such that when applied to the actuator the average light power received by the compensation photodetector should be substantially equal to half its maximum value, and a fourth voltage level different from the third voltage level defined such that when applied to the actuator the average light power received by the compensation photodetector should be substantially equal to half its maximum value,
wherein the compensation detection arrangement generates the feedback signal in dependence upon the light power detected by the compensation photodetector when driven with the driving waveform.

11. The gas velocity sensor according to claim 10, wherein in operation the waveform includes continuous repetitions of the first voltage level, the third voltage level, the fourth voltage level, the second voltage level, the fourth voltage level, the third voltage level.

12. The gas velocity sensor according to claim 9, further comprising:
a summing amplifier to add a signal dependent upon the feedback signal to the driving waveform prior to driving the electromechanical actuator such that the feedback signal tends towards zero.

13. The gas velocity sensor according to claim 1, wherein the electromagnetic radiation source is operable to produce ultra-violet radiation.

14. The gas velocity sensor according to claim 1, wherein the electromagnetic radiation source includes a laser.

15. The gas velocity sensor according to claim 14, wherein the electromagnetic radiation source includes a pulsed laser.

16. A method of determining gas velocity, the method comprising:
generating transmitted radiation having an expected transmission frequency;
detecting backscattered radiation;
determining gas velocity in dependence upon any Doppler shift of the frequency of the backscattered radiation;
determining a transmission frequency of the transmitted radiation; and
detecting any difference between the measured transmission frequency and the expected transmission frequency and generating a feedback signal therefrom;
wherein the determining of the gas velocity is further in dependence upon the feedback signal.

17. The method according to claim 16, wherein the detecting of backscattered radiation includes the sub-steps of:
passing at least some of the backscattered radiation through an interferometer to produce an interference pattern;
passing the output of the interferometer through a backscatter spatial filter having a structure of transparent and opaque regions corresponding to the interference pattern; and
detecting the output from the spatial filter with a backscatter photodetector.

18. The method according to claim 17, wherein the determining of the transmission frequency of the transmitted radiation includes:
passing at least some of the transmitted radiation through the interferometer to produce an interference pattern;
passing the output of the interferometer through a compensation spatial filter having a structure of transparent and opaque regions corresponding to the interference pattern; and
detecting the output from the compensation spatial filter with a compensation photodetector.

19. The method according to claim 17, further comprising:
moving at least one reflector so that the separation between the reflectors is varied and measuring the output of the photodetector at a plurality of reflector separations,
wherein the interferometer has a pair of reflectors at least one of which is moveable.

20. The method according to claim 19, wherein the determining of the gas velocity in dependence upon any Doppler shift of the frequency of the backscattered radiation includes:
setting a first reflector separation such that the average light power per pulse received by the backscatter photodetector should be substantially equal to half its maximum value;
detecting a first average light power Q1 received by the photodetector setting a second reflector separation different from the first separation such that the average light power per pulse received by the backscatter photodetector should be substantially equal to half its maximum value;
detecting a second average light power Q2 received by the photodetector;
generating a quantity R proportional to any Doppler shift according to the equation $$R=(Q1-Q2)/(Q1+Q2); \text{ and}$$

determining the gas velocity in dependence upon the quantity R.

21. The method according to claim 20, wherein the generating of a feedback signal includes:
setting a third reflector separation such that the average light power per pulse received by the compensation photodetector should be substantially equal to half its maximum value;
detecting an average light power P1 received by the compensation photodetector;
setting a fourth reflector separation different from the third separation such that the average light power per pulse received by the compensation photodetector should be substantially equal to half its maximum value;

detecting an average light power P2 received by the compensation photodetector; and generating a quantity S proportional to any detected difference according to the equation S=(P1−P2)/(P1+P2); and generating the feedback signal in dependence up the quantity S.

22. The method according to claim 19, wherein the reflector separation depends upon the feedback signal.

23. The method according to claim 16, further comprising: measuring the amplitude of the transmitted radiation, wherein the determining of the gas velocity in dependence upon any Doppler shift of the frequency of the backscattered radiation also depends upon the amplitude.

24. The method according to claim 16, further comprising: measuring the amplitude of the transmitted radiation and in which the step of generating a feedback signal is further in dependence upon the amplitude.

25. The gas velocity sensor according to claim 7, wherein the feedback path is connected such that movement of the movable reflector depends upon the feedback signal.

* * * * *